United States Patent
Utsunomiya

(10) Patent No.: US 7,556,383 B2
(45) Date of Patent: Jul. 7, 2009

(54) PROJECTION DISPLAY APPARATUS USING LIQUID COOLING AND AIR COOLING

(75) Inventor: Motoyasu Utsunomiya, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 462 days.

(21) Appl. No.: 11/376,308

(22) Filed: Mar. 16, 2006

(65) Prior Publication Data

US 2006/0209266 A1 Sep. 21, 2006

(30) Foreign Application Priority Data

Mar. 17, 2005 (JP) .............................. 2005-077174

(51) Int. Cl.
- G03B 21/18 (2006.01)
- G03B 21/26 (2006.01)
- G03B 21/16 (2006.01)
- G03B 21/14 (2006.01)
- G02F 1/1333 (2006.01)
- G02F 1/1347 (2006.01)
- G02F 1/1335 (2006.01)

(52) U.S. Cl. .............................. 353/61; 353/54; 353/60; 353/81; 353/20; 349/58; 349/5; 349/80; 349/96

(58) Field of Classification Search .................. 353/61, 353/52, 54, 57, 60, 81, 20; 349/58, 5, 80, 349/96

See application file for complete search history.

(56) References Cited

U.S. PATENT DOCUMENTS

| | | | |
|---|---|---|---|
| 6,254,238 B1 * | 7/2001 | Takamatsu | 353/61 |
| 6,844,993 B2 * | 1/2005 | Fujimori et al. | 359/820 |
| 2002/0135741 A1 * | 9/2002 | Lee et al. | 353/61 |
| 2003/0169507 A1 * | 9/2003 | Hashizume et al. | 359/634 |
| 2005/0117077 A1 * | 6/2005 | Utsunomiya | 349/5 |
| 2005/0220156 A1 * | 10/2005 | Kitabayashi | 372/35 |

FOREIGN PATENT DOCUMENTS

| | | |
|---|---|---|
| JP | 5-158152 | 6/1993 |
| JP | 11-119182 | 4/1999 |
| JP | 11-160793 | 6/1999 |
| JP | 11-271880 | 10/1999 |
| JP | 2000-269674 | 9/2000 |
| JP | 2001-22012 | 1/2001 |
| JP | 2001-264882 | 9/2001 |
| JP | 2002-139795 | 5/2002 |

(Continued)

Primary Examiner—Diane I Lee
Assistant Examiner—Magda Cruz
(74) Attorney, Agent, or Firm—McGinn IP Law Group PLLC

(57) ABSTRACT

A projection display apparatus comprises a liquid crystal unit assembly which includes a liquid crystal panel, an incident side polarizing plate and an emitting side polarizing plate which are arranged on an incident side and on an emitting side of the liquid crystal panel, respectively, and a color combining prism. The apparatus further comprises a fan; a duct which is connected to the fan and which is provided with an opening for supplying cooling air, wherein the opening is arranged near the liquid crystal panel and the incident side polarizing plate; a holder for holding the emitting side polarizing plate and the color combining prism; and a heat exchanger which is connected to the holder, wherein the heat exchanger uses liquid coolant.

20 Claims, 16 Drawing Sheets

FOREIGN PATENT DOCUMENTS

| | | |
|---|---|---|
| JP | 2002-236278 | 8/2002 |
| JP | 2002-268139 | 9/2002 |
| JP | 2002-287244 | 10/2002 |
| JP | 2003-57754 | 2/2003 |
| JP | 2003-195253 | 7/2003 |
| JP | 2003-233132 | 8/2003 |
| JP | 2003-262917 | 9/2003 |
| JP | 2004-78164 | 3/2004 |
| JP | 2004-170512 | 6/2004 |
| JP | 2004-279778 | 10/2004 |
| JP | 2004-317956 | 11/2004 |
| JP | 2004-354795 | 12/2004 |
| JP | 2004-354853 | 12/2004 |
| JP | 2005-25123 | 1/2005 |
| WO | WO 02/019027 A1 | 7/2002 |

* cited by examiner

PROJECTION DISPLAY APPARATUS USING LIQUID COOLING AND AIR COOLING

BACKGROUND OF THE INVENTION

1. Field of the Invention

The present invention relates to a projection display apparatus for projecting and displaying an image using a liquid crystal panel, especially to a mechanism and a method for cooling the liquid crystal panel and polarizing plates.

2. Description of the Related Art

In a LCD (Liquid Crystal Display) projector apparatus, which is a projection display apparatus, the quality of projected images is rapidly improving by virtue of the improved luminous efficiency of a lamp, the increased density and aperture ratio of light valves, and improvements in illuminating optical system. Therefore, LCD projectors are used in wide applications from home theater use to business presentation use.

Referring to FIG. 1, explanations are given about the basic configuration of a conventional LCD projector. An LCD projector according to the present invention also has the same configuration as will be explained below. Therefore, the same reference numerals are used for the elements that are common in the present invention. LCD projector 1 includes illuminating optical system 2, color separating optical system 7, and focusing optical system 12 as basic systems.

Illuminating optical system 2 is provided with light source 3 including a high-luminance lamp, such as an ultra high pressure mercury lamp, reflector 4 to reflect light that is emitted from light source 3, light integrators 5a, 5b to obtain an uniform illumination distribution of the light that is reflected by reflector 4, polarizing beam splitter (PBS) 6 to convert randomly polarized light into linearly polarized light, and field lens 11a.

Color separating optical system 7, which is positioned downstream relative to illuminating optical system 2, is provided with field lens 11b, dichroic mirrors 8a, 8b, reflective mirrors 9a, 9b, 9c, 9d, and relay lenses 10a, 10b. Dichroic mirrors 8a, 8b separate light that comes from illuminating optical system 2 into color bands of red (R), green (G), and blue (B), and make the color bands incident on the corresponding liquid crystal panels.

Focusing optical system 12, which is positioned downstream relative to color separating optical system 7, is provided with optical modulation portion 13 to modulate each color band that is emitted from color separating optical system 7 in accordance with given image information, color combining prism 14 to combine the color bands that are modulated, and projection lens 15 to project the combined light onto a screen.

Optical modulation portion 13 is provided with three liquid crystal panels 16a, 16b, 16c, which are translucent display devices, incident side polarizing plates 17a, 17b, 17c which are arranged on the incident sides of the respective liquid crystal panels, and emitting side polarizing plates 18a, 18b, 18c which are arranged on the emitting sides of the respective liquid crystal panels.

Since a TN (Twisted Nematic) liquid crystal panel can use only a light component that is polarized linearly in a specific direction, each color band that is emitted from color separating optical system 7 is polarized in a predetermined direction by incident side polarizing plates 17a, 17b, 17c (P polarization). P-polarized color bands are modulated by liquid crystal panels 16a, 16b, 16c, and only S-polarized components of the modulated color bands pass through emitting side polarizing plates 18a, 18b, 18c.

The above-described optical system is applied to a three-panel LCD projector in which light that comes from a lamp is separated into three primary color bands, and the separated color bands are modulated by three liquid crystal panels, respectively. However, an optical modulation unit having a similar configuration can also be applied to a single-panel LCD projector which has single liquid crystal panel and which is less bright and less expensive.

In such optical modulation portion 13, incident side polarizing plates 17a, 17b, 17c and emitting side polarizing plates 18a, 18b, 18c tend to be heated by heat absorption, because each plate transmits only the light beam that is polarized in one direction and shields the remaining light beams. Further, liquid crystal panels 16a, 16b, 16c generate heat during operation because black matrixes, which are arranged between pixels, shield the light beams.

Liquid crystal panels and polarizing plates are often made of organic materials. Therefore, an orientation layer of the panel may be damaged or the polarization characteristic of the polarizing plate may be degraded when the liquid crystal panels and the polarizing plates are irradiated by light having short wavelengths for a long period, or are exposed under high temperature conditions, resulting in a serious loss of the functions. This phenomenon may shorten the life time of the product, and raise maintenance cost due to the replacement of the unit. Further, the quality of the combined projection image may be degraded because of the fluctuation in the properties of each color band. For these reasons, there exist a need for measures against heating of an optical modulation unit.

Now, conventional methods for cooling incident side polarizing plates, emitting side polarizing plates, and liquid crystal panels to suppress temperature rise will be briefly described. In this specification, the combination of an incident side polarizing plate, an emitting side polarizing plate, and a liquid crystal panel is called a liquid crystal unit. The combination of three liquid crystal units and a color combining prism is called a liquid crystal unit assembly.

Referring to FIGS. 2A and 2B, cooling air 124 is supplied by fan 120 via an intake, not shown, which is provided on the housing of a LCD projector. The air is conveyed to duct openings 122a, 122b, 122c via the exhaust of the fan and duct 121. Duct openings 122a, 122b, 122c are arranged just below corresponding liquid crystal units 119 of liquid crystal unit assembly 123.

Incident side polarizing plate 117, liquid crystal panel 116, and emitting side polarizing plate 118, which together constitute each of three liquid crystal units 119, are spaced with gaps. Cooling air 124 passes through the gaps from bottom to top, and heat is removed from the surfaces through forced convection heat transfer.

A mechanism for cooling a liquid crystal unit using a coolant tank is disclosed in Japanese Patent Laid-Open Publication No. 2002-287244 (Patent Document 1) and No. 2003-195253 (Patent Document 2). Referring to FIG. 3, liquid coolant 233 that is filled in coolant tank 243 is held between emitting side polarizing plate 218 of liquid crystal unit assembly 223 and seal plate 244. This prior art is characterized such that coolant tank 243 is fixed to the side wall of holders 228 for color combining prism 214. Referring to FIG. 4, liquid coolant is filled in coolant tank 343 of liquid crystal unit assembly 323. This prior art is characterized such that liquid crystal panels 316 is also cooled in addition to emitting side polarizing plates.

Japanese Patent Laid-Open Publication No. 160793/99 (Patent Document 3) discloses a mechanism, which has a heat sink that is mounted in a duct, for cooling liquid crystal units.

Referring to FIG. 5, liquid crystal unit assembly 423 that includes incident side polarizing plates, liquid crystal panels, and emitting side polarizing plates is cooled by forced air cooling. Cooling air flows in an airtight closed duct, and heat sink 438 to cool the air is arranged in duct 446.

Japanese Patent Laid-Open Publication No. 2000-269674 (Patent Document 4) discloses a mechanism for cooling liquid crystal units in which a heat sink that is connected with a Peltier element is arranged in a duct. Referring to FIG. 6, first heat sink 538a for receiving heat, which is connected with Peltier element 539, is inserted into duct 521 that is connected to cooling fan 520. Second heat sink 538b for discharging heat is connected to a heat-discharging side of Peltier element 539. Since air that is pre-cooled to a lower temperature is supplied to the liquid crystal unit, not shown, the cooling efficiency can be enhanced.

However, there are the following drawbacks in the prior art techniques. In accordance with the increasing need for a reduction in size and an increase in brightness of LCD projectors, lamp output has been increased and the size of display devices has been reduced. As a result, the heat load has been increased due to the increased density of luminous flux that is incident on a liquid crystal unit.

For example, a LCD projector (1.0 type-XGA) in 2000 lm class has a total heat generation of approximately 15 W in liquid crystal units, and a heat flux of approximately 0.6 $W/cm^2$ in an emitting side polarizing plate. On the other hand, a LCD projector in 5000 lm class has a heat generation of approximately 35 W or more in liquid crystal units, and a heat flux of approximately 1.4 $W/cm^2$ or more in an emitting side polarizing plate.

In the prior art using forced air cooling, which was explained with reference to FIGS. 2A and 2B, the flow rate of supply air is increased in order to cope with the increased heat load. The flow velocity of the cooling air around a heat source is increased, and a larger amount of heat can be removed from the heat source due to the improved heat transfer efficiency and the improved cooling capability.

In order to increase the flow rate of supply air that is supplied by a fan, a fan with a larger diameter or with a higher speed is used. In an application to cool liquid crystal units, a fan with a higher speed is used taking into consideration the structural limitation for mounting a fan. However, the increase in the number of revolutions of a fan directly causes an increase in noise, which impairs comfortable operation for users and also causes degradation in commercial value. This is the reason why various measures have been taken, as described in Patent Documents 1 to 4.

According to the prior arts that are disclosed in Patent Documents 1 and 2, liquid coolant that is filled into coolant tanks 243, 343 is in contact with an emitting side polarizing plate or liquid crystal panel 316, and heat is removed via the contact area through heat diffusion. However, these prior arts have the following problems.

The first problem is the quality of images. Since liquid coolant is filled between the optical elements of the liquid crystal unit, light passes through a liquid layer that exists between the optical elements. For example, referring to Patent Document 2, there is a liquid layer between the liquid crystal panel and the emitting side polarizing plate. Such a liquid layer disturbs the polarization of light when the light passes through the liquid layer due to the generation of bubbles, fluctuations in the coolant density that is caused by heat transportation, and convection-induced thermal fluctuations that is caused by the fluctuations in the coolant density.

As a result, image information that passes through emitting side polarizing plate 118 is disturbed, resulting in degraded quality of projected images.

The second problem is reliability and mountability. In a liquid cooling system for removing heat from optical elements in liquid crystal unit assembly 223, 323, the liquid coolant expands and contracts repeatedly depending on the operation condition. Therefore, the coolant tank has a pressure regulating mechanism to accommodate the expansion and contraction. However, there is a risk of leakage of coolant due to failure of the pressure regulating mechanism after long use. Additionally, the complicated sealing mechanism and pressure regulating mechanism of coolant tanks 243, 343 make the assembling process of the liquid crystal unit more difficult.

SUMMARY OF THE INVENTION

It is an object of the present invention to provide a projection display apparatus that has a long life time, is less noisy, and has a potential for a reduction in size and a higher brightness.

It is another object of the present invention to provide a method for cooling liquid crystal units so that they are less noisy and have a high cooling efficiency.

According to an embodiment of the present invention, a projection display apparatus comprises a liquid crystal unit assembly which includes a liquid crystal panel, an incident side polarizing plate and an emitting side polarizing plate which are arranged on an incident side and on an emitting side of the liquid crystal panel, respectively, and a color combining prism. The apparatus further comprises a fan; a duct which is connected to the fan and which is provided with an opening for supplying cooling air, wherein the opening is arranged near the liquid crystal panel and the incident side polarizing plate; a holder for holding the emitting side polarizing plate and the color combining prism; and a heat exchanger which is connected to the holder, wherein said heat exchanger uses liquid coolant.

Since the liquid crystal panel and the incident side polarizing plate are cooled by air, considerable flexibility is provided as to where they can be located. The emitting side polarizing plate, which can be arranged at a fixed location, is connected to the holder having high thermal conductivity, which holds the color combining prism, via the frame member which has high thermal conductivity. Therefore, the heat that is generated in the emitting side polarizing plate is transmitted to the heat exchanger, which is attached to the holder, through solid heat transmission. In this way, each element is efficiently cooled by air or liquid.

According to a projection display apparatus that is provided with a mechanism for cooling liquid crystal units of the present invention, the following advantages are obtained.

Specifically, since the liquid crystal panel requires optical adjustment in the direction of X, Y, and θ relative to an optical axis during assembling, it is difficult to integrate the liquid panel with the holder. The incident side polarizing plate requires the adjustment of a polarizing axis relative to the liquid crystal panel. Therefore, the liquid crystal panel and the incident side polarizing plate are cooled by forced air cooling. On the other hand, the emitting side polarizing plate, which does not need adjustment of the polarizing axis, is cooled by liquid. Specifically, heat is transmitted to an external heat exchanger, such as a water cooling module or a heat pipe, through solid heat transmission via the holder that holds the color combining prism.

Since the cooling air, which is supplied by a forced air cooling system, is concentrated on the incident side polarizing plate and the liquid crystal panel, these elements can be efficiently cooled depending on the brightness without increasing the flow rate of the cooling air; leading to an operation with low noise.

On the other hand, a solid heat transmission system cools only the emitting side polarizing plate that is adjacent to the color combining prism. Therefore, heat can be conducted to the heat exchanger by means of a simple holding structure, and the air cooling operation, which is mentioned above, is not interfered with.

The emitting side polarizing plate is sandwiched between a translucent plate and the color combining prism, both of which have higher thermal conductivity than the polarizing plate, without a gap, and is fixed to the upper and lower holders for the color combining prism by means of a frame member having high thermal conductivity. Accordingly, the heat in the polarizing plate can be diffused from both surfaces thereof, i.e., from the color combining prism and from the translucent plate, and thus the heat spots can be reduced. Further, heat can be transferred with a higher efficiency due to solid heat transmission through two paths, i.e., 1) from the polarizing plate, via the color combining prism, the holder, to the heat exchanger; and 2) from the polarizing plate, via the translucent plate, the thermal conductive frame, the holder, to the heat exchanger.

Of the holders which are thermally connected to the emitting side polarizing plate, the holder that is on the side of a duct for forced air cooling may have a heat sink having radiating fins which are inserted into the duct, in order to simplify the mechanism for cooling the emitting side polarizing plate. Such a configuration, which halves the cooling load of the heat exchanger, allows a cooling mechanism that is compact, inexpensive, and easy to mount.

Further, the radiator for the heat exchanger may be arranged near the intake of the air cooling fan for cooling the incident side polarizing plate and the liquid crystal panel, in order to utilize the air flow for the air cooling fan and also for the heat radiation of the radiator. Such a configuration can suppress the total fan capacity in the cooling system, and allows a cooling mechanism that is more compact and less expensive.

As explained above, in the projection display apparatus and the method for cooling a liquid crystal unit according to the present invention, the incident side polarizing plate and the liquid crystal panel are intensively cooled by forced air cooling, and the emitting side polarizing plate is cooled by transmitting the heat to the heat exchanger through solid heat transmission. Even if heat absorption increases in accordance with an increase in brightness of the apparatus, a cooling margin can be ensured without increasing fan power, and cooling operation with low noise can be achieved.

The heat that is generated in the emitting side polarizing plate is diffused from the incident side surface and from the emitting side surface through the translucent plate and the color combining prism, which are in contact with the emitting side polarizing plate and have excellent thermal conductivity, and is transmitted to the upper and lower holders. Accordingly, the emitting side polarizing plate can be effectively cooled with a small temperature gradient along the surfaces.

Further, the heat exchanger that is connected to the lower holder may be replaced with a heat sink such that heat is radiated through the heat radiating fins of the heat sink that are inserted into the duct for the forced air cooling system that co-operates with the liquid cooling system. Such a configuration can also provide a LCD projector having a cooling mechanism that is compact, inexpensive, and easy to mount.

Additionally, the radiator for the heat exchanger may be arranged near the intake of the cooling fan for forced air cooling system that co-operates with the liquid cooling system, and the air flow toward the intake may be used for radiation of the heat. This arrangement allows a cooling system that is compact, less noisy, and inexpensive.

The above and other objects, features, and advantages of the present invention will become apparent from the following description with reference to the accompanying drawings which illustrate examples of the present invention.

BRIEF DESCRIPTION OF THE DRAWINGS

FIGS. 9A to 9C are views showing a holding structure for an emitting side polarizing plate according to the first embodiment, wherein FIG. 9A is a partial sectional view of a mechanism for cooling liquid crystal units, FIG. 9B is a perspective view of the holding structure, and FIG. 9C is an exploded view of the holding structure;

FIGS. 16A to 16C are views showing a mechanism for cooling liquid crystal units according to a third embodiment of the present invention, wherein FIG. 16A is a perspective view, FIG. 16B is a side view, and FIG. 16C is a partial sectional view showing the operation.

DESCRIPTION OF THE PREFERRED EMBODIMENTS

With reference to the drawings, detailed explanations are given about a mechanism for cooling liquid crystal units according to the first embodiment of the present invention.

Figure 1:
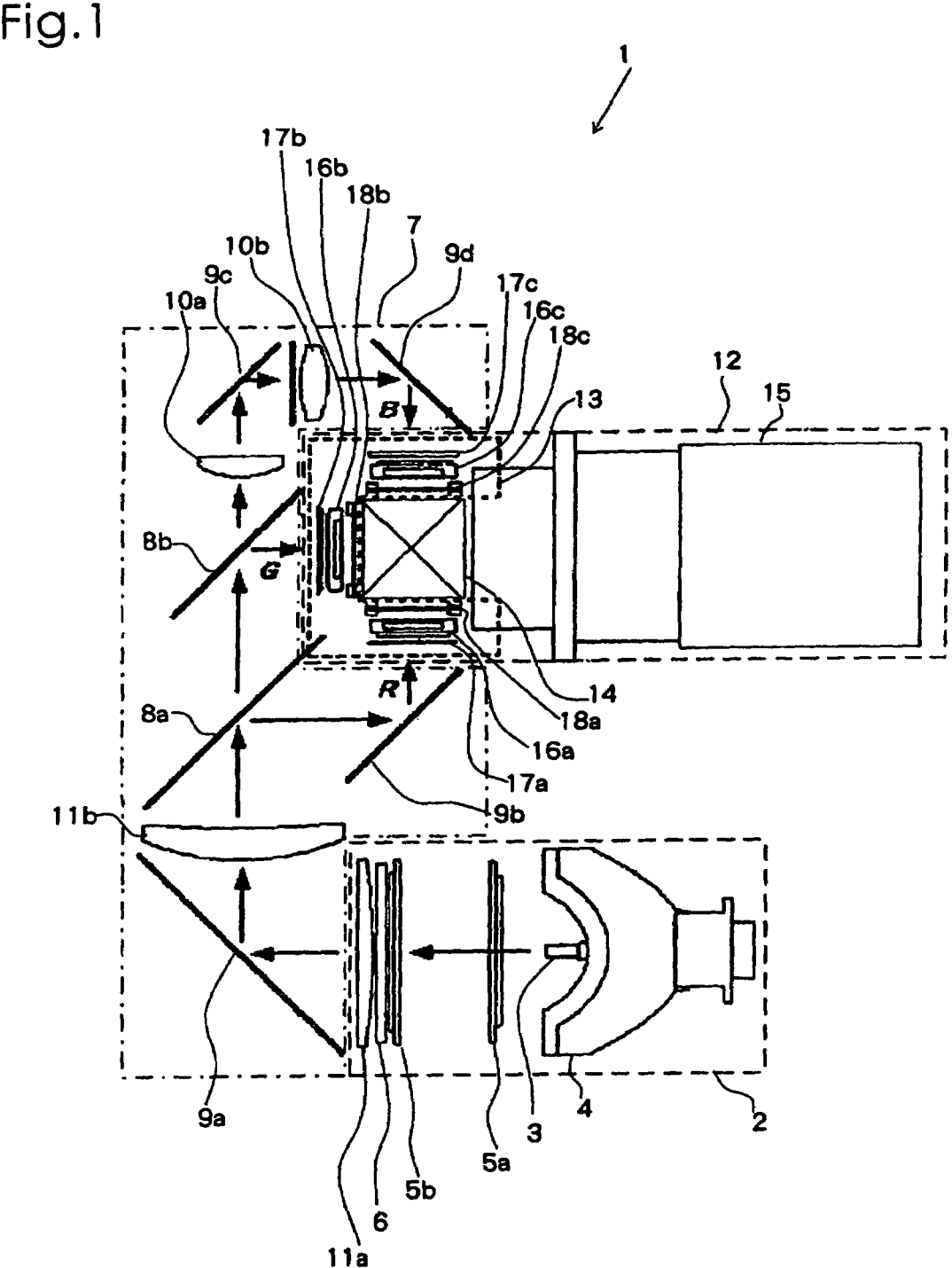
FIG. 1 is a schematic view showing the basic configuration of a typical LCD projector according to prior art.
Figure 2A:
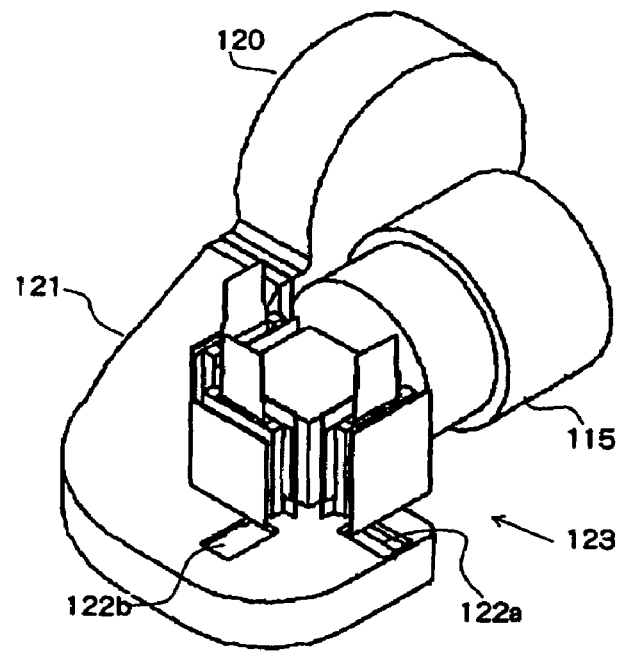
FIG. 2A is a schematic perspective view of a cooling device for liquid crystal units using forced air cooling according to prior art.
Figure 2B:
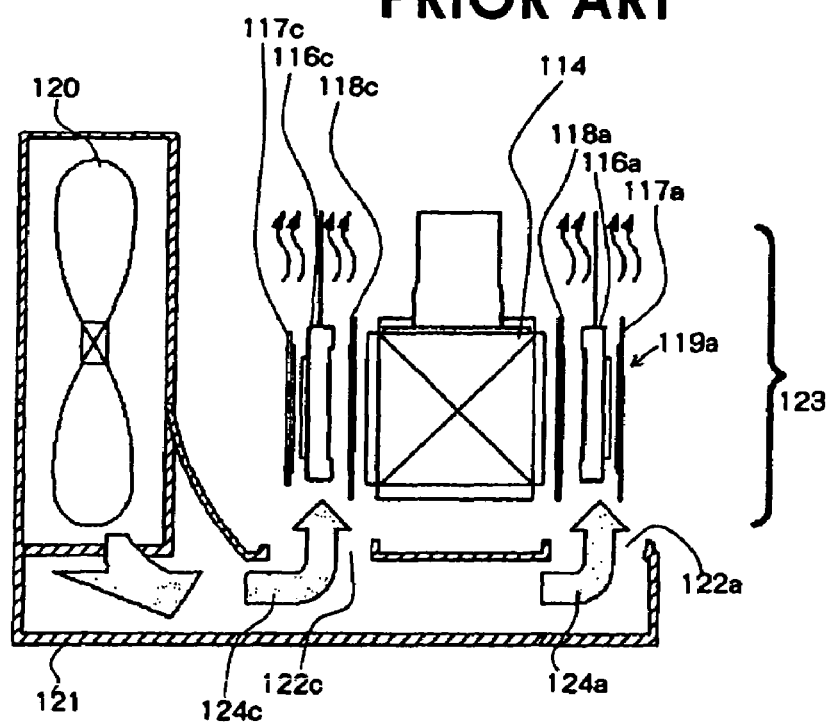
FIG. 2B is a schematic sectional view of the cooling device shown in FIG. 2A.

The same reference numerals are given to the elements and the structures that have the same functions as conventional mechanisms for cooling liquid crystal units that are explained with reference to FIGS. 1 and 2. In this specification, as described above, the combination of an incident side polarizing plate, an emitting side polarizing plate, and a liquid crystal panel is called liquid crystal unit 19. The combination of three liquid crystal units, a color combining prism, and holding members is called liquid crystal unit assembly 23.

Figure 7:
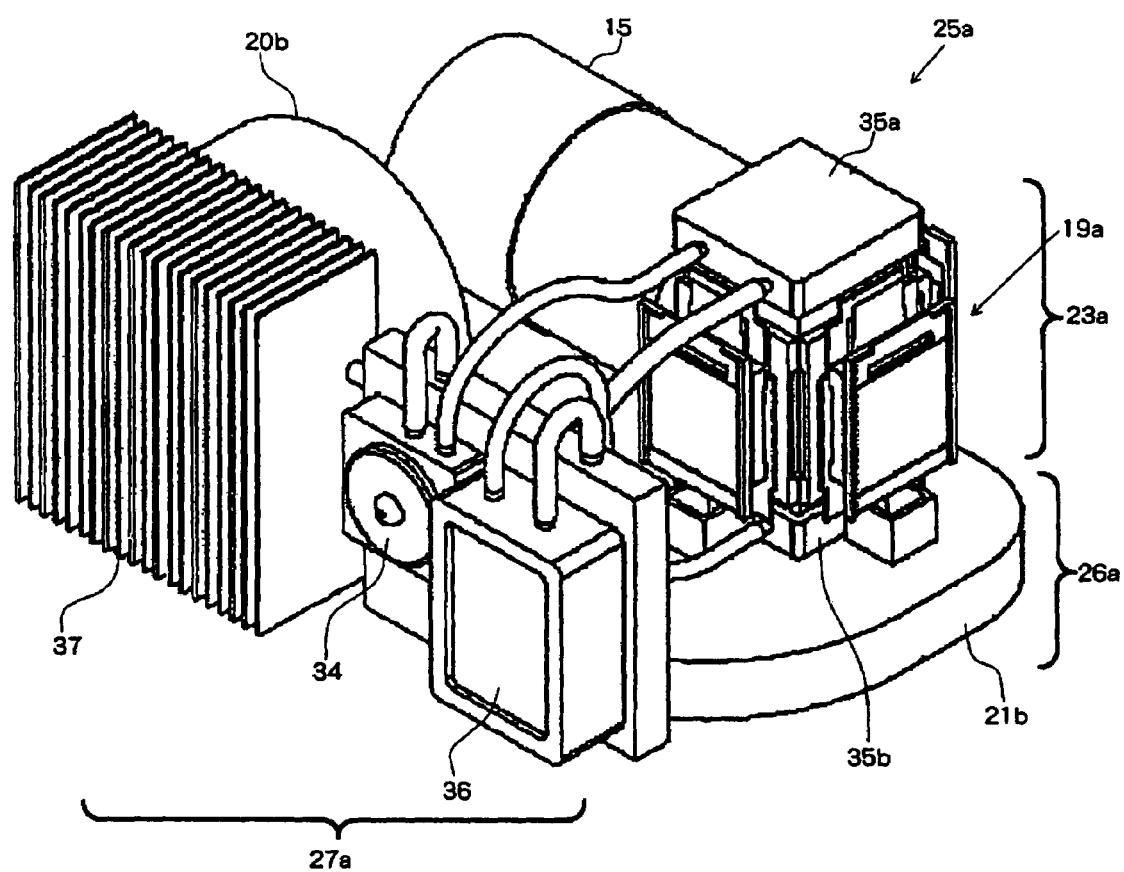
FIG. 7 is a perspective view of a mechanism for cooling liquid crystal units according to a first embodiment of the present invention.
Figure 8:
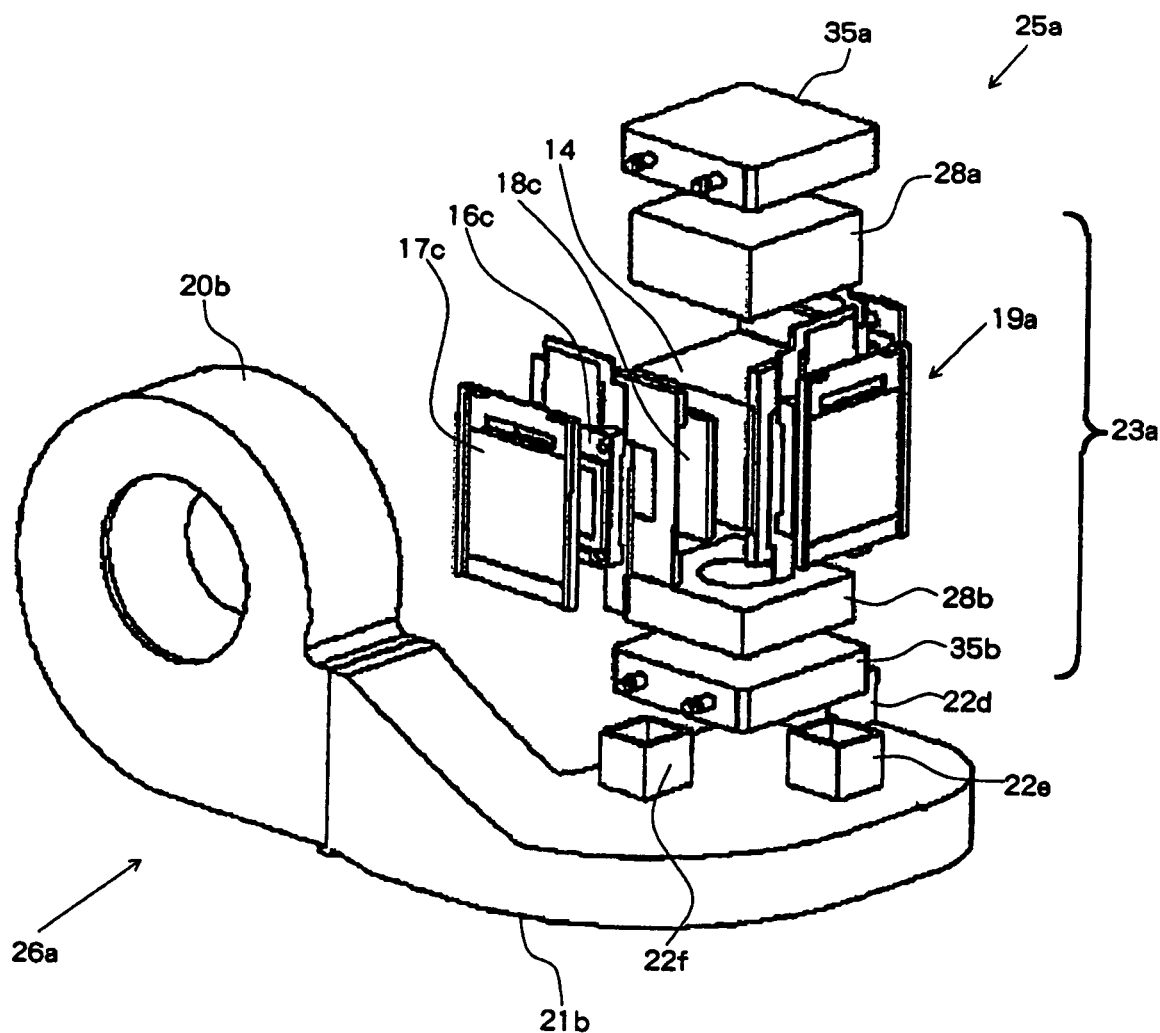
FIG. 8 is a partial exploded view of the cooling mechanism shown in FIG. 7.
Figure 9A:
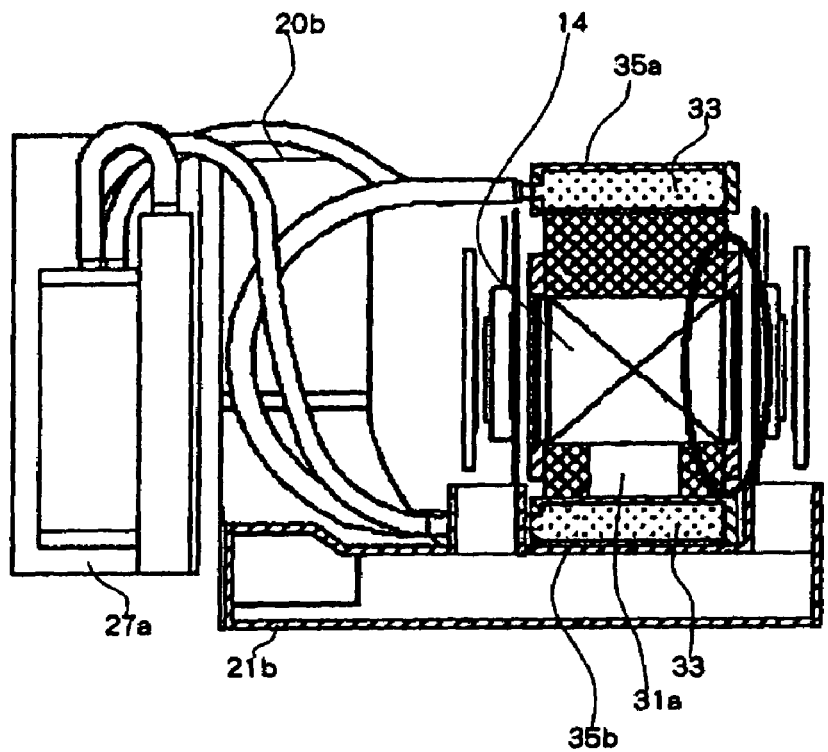
Figure 9B:
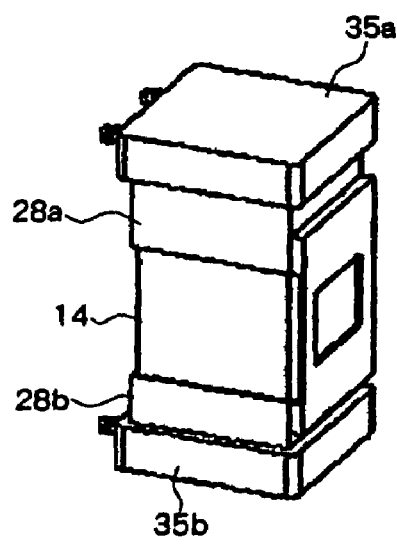
Figure 9C:
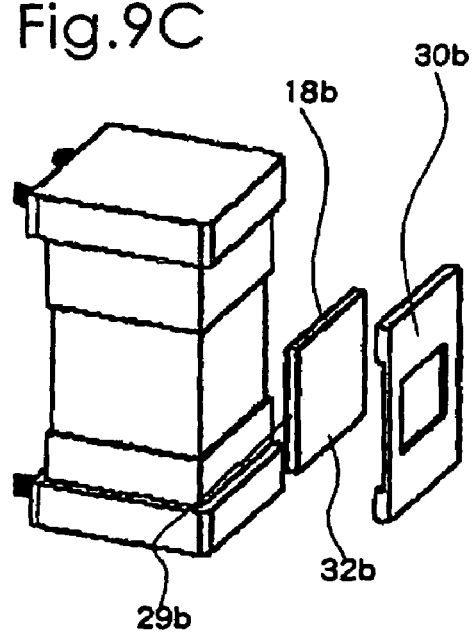

Referring to FIGS. 7 and 8, mechanism for cooling liquid crystal units 25a according to the first embodiment consists of liquid crystal unit assembly 23a, air cooling module 26a, and liquid cooling module 27a which functions as a heat exchanger.

Liquid crystal unit assembly 23a, similarly to the prior arts that are described with reference to FIGS. 1 and 2, consists of three liquid crystal panels 16 which correspond to the respective color bands, three incident side polarizing plates 17, three emitting side polarizing plates 18, color combining prism 14, and a pair of holders 28a, 28b to hold color combining prism 14 from the top side and from the bottom side. Three emitting side polarizing plates 18 are arranged between color combining prism 14 and respective translucent plates 29, and are fixed to a pair of holders 28a, 28b by means of respective frame members 30, as shown in FIG. 1A.

Holders 28a, 28b are made of materials having a high thermal conductivity and good processability, such as aluminum or magnesium alloy. Color combining prism 14 is held by holders 28a, 28b from the top side and from the bottom side using an ultraviolet (UV) curing adhesive. Through hole 31a is formed on the central portion of either of holders 28a, 28b to allow UV irradiation.

Frame members 30 are also made of materials having a high thermal conductivity and good processability. Frame members 30 are configured such that they do not shield light that passes through the liquid crystal panel, and such that translucent plates 29, which have emitting side polarizing plate 18 and optical compensation film 32 on both sides, are securely held by frame members 30, and further such that frame members 30 are thermally connected to holders 28a, 28b. In order to reduce thermal resistance between frame members 30 and holders 28a, 28b, a thermal interface, such as a sheet having a high thermal conductivity, silicon grease, or a phase-change sheet, may be provided at the boundary between frame members 30 and holders 28a, 28b.

Liquid cooling module 27a may be a general-purpose water cooling module that may be used to cool a central processing unit (CPU) in a personal computer. Liquid cooling module 27a consists of pump 34, jackets 35a, 35b having a flow passage inside, reservoir tank 36, and radiator 37. Pump 34 circulates liquid coolant 33 that includes propylene alcohol or ethylene glycol. Reservoir tank 36 compensates for the loss of liquid coolant 33 that is caused by volatilization from fiber holes in connecting tubes, and suppresses the rise in internal pressure that is caused by thermal expansion. Radiator 37 radiates the heat in liquid coolant 33 whose temperature increases because of heat absorption.

A pair of jackets 35a, 35b are connected to holders 28a, 28b via surfaces that are opposite to the surfaces to which color combining prism 14 is attached. Jackets 35a, 35b receive the heat, which is generated in emitting side polarizing plates 18a, 18b, 18c, via holders 28a, 28b. The heat is conveyed to radiator 37 by circulating liquid coolant 33.

Air cooling module 26a, which consists of cooling fan 20b and duct 21b, is arranged under liquid crystal unit assembly 23a. Duct openings 22d, 22e, 22f are arranged such that cooling air that is supplied by the fan is concentrated on liquid crystal panels 16a, 16b, 16c and incident side polarizing plates 17a, 17b, 17c.

Figure 11:
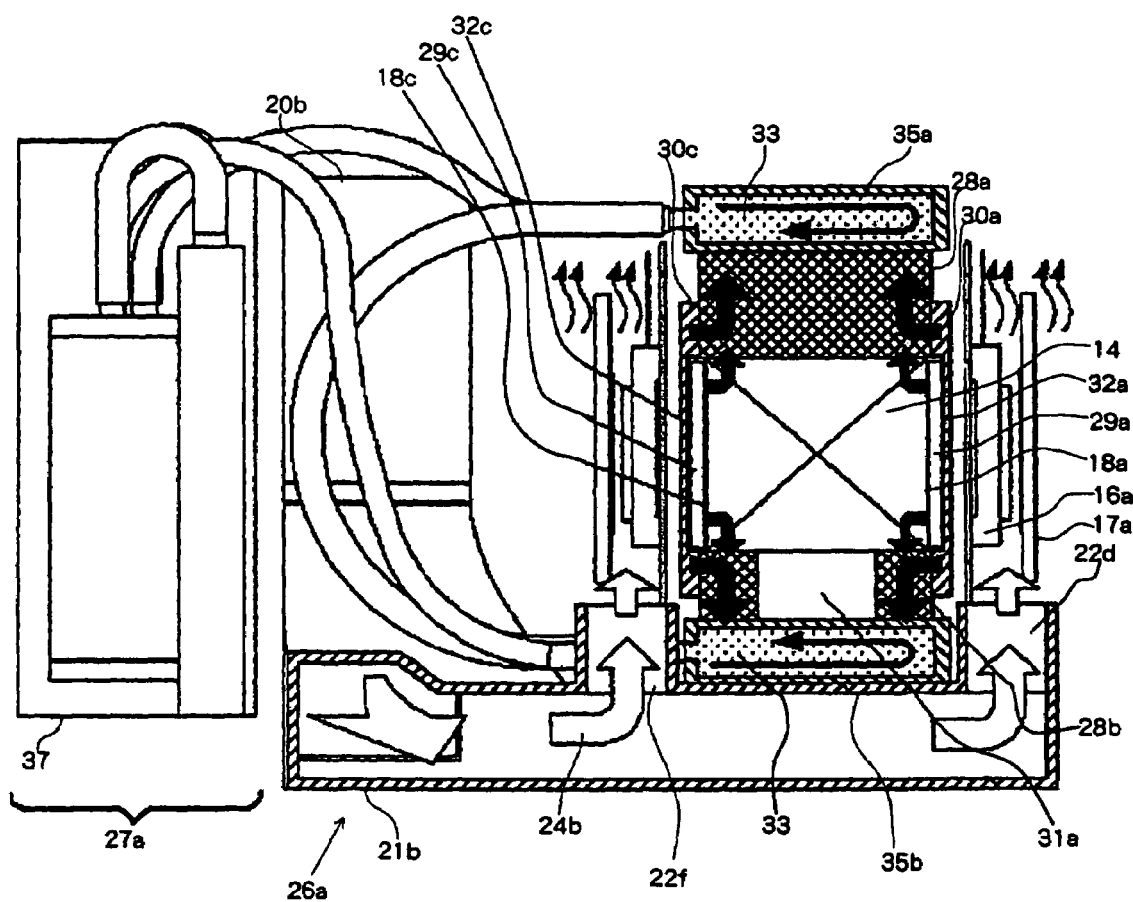
FIG. 11 is a sectional view showing the operation of the mechanism for cooling liquid crystal units according to the first embodiment of the present invention.

Next, operation of mechanism for cooling liquid crystal units 25a is explained with reference to FIG. 11. Liquid crystal panels 16a, 16b, 16c and incident side polarizing plates 17a, 17b, 17c are arranged in the same optical relationship as in prior art, and are heated by heat absorption. Cooling air 24b, which flows in duct 21b of air cooling module 26a, comes into contact with the surfaces of liquid crystal panels 16a, 16b, 16c and incident side polarizing plates 17a, 17b, 17c to cool them through heat transfer by using forced air cooling.

Duct openings 22d, 22e, 22f of duct 21b are arranged only near incident side polarizing plates 17a, 17b, 17c and liquid crystal panels 16a, 16b, 16c. In prior art, emitting side polarizing plates, as well as incident side polarizing plates and liquid crystal panels, are cooled by forced air cooling, whereas, the emitting side polarizing plates need not be cooled by forced air cooling in this embodiment. This leads to the following advantages. (1) The efficiency of forced air cooling can be enhanced due to the concentration of cooling air on the incident side polarizing plates and the liquid crystal panels. (2) The margin of cooling capacity can be ensured because of the reduction in the total heat that is to be removed. In other words, since the increase in heat absorption caused by the increase in brightness can be coped with without increasing fan power, an increase in noise during operations can be suppressed.

Emitting side polarizing plates 18a, 18b, 18c are sandwiched between color combining prism 14 and translucent plates 29a, 29b, 29c without gaps, as described above, and are connected with, or attached to, holders 28a, 28b by pressing frame members 30a, 30b, 30c against holders 28a, 28b.

The heat in emitting side polarizing plates 18a, 18b, 18c that is generated by heat absorption is diffused from the incident side and from the emitting side of the light transparent surface, via translucent plates 29a, 29b, 29c and color combining prism 14 that are in contact with emitting side polarizing plates 18a, 18b, 18c. The heat is transferred to holders 28a, 28b, which are arranged on the bottom side and the top side, through color combining prism 14 and frame members 30a, 30b, 30c, as shown by the black arrows in FIG. 11.

The heat that is transmitted to holders 28a, 28b is conveyed to jackets 35a, 35b of liquid cooling module 27a, which are connected with the surfaces of holders 28a, 28b that are opposite to the surfaces to which color combining prism 14 is attached, and is transported to radiator 37 through the circulation of liquid coolant 33, and radiated to the surrounding air.

Frame members 30 and holders 28 are preferably made of materials having a high thermal conductivity, such as aluminum or magnesium, in order to reduce thermal resistance. Translucent plates 29 and color combining prism 14 are preferably made of transparent materials having a higher thermal conductivity than emitting side polarizing plates 18, such as sapphire or quartz. This contributes to the reduction in heat spots due to increased thermal diffusion efficiency, and to a longer life time due to limited temperature rise in the polarizing plates.

Figure 10A:
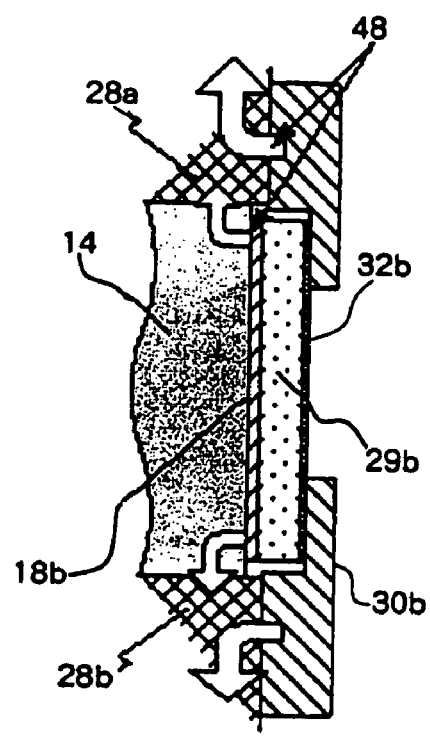
FIGS. 10A to 10C are partial sectional views showing holding structures for an emitting side polarizing plate according to the first embodiment.
Figure 10B:
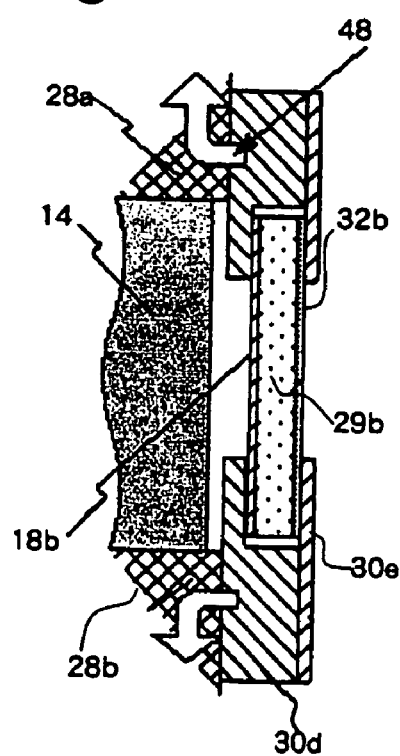

Alternatively, two frame members 30d, 30e having a high thermal conductivity may be used as shown in FIG. 10B, instead of the configuration in FIG. 10A when it is difficult to use materials having a high thermal conductivity for the color combining prism because of manufacturing cost. Translucent plate 29d, to which emitting side polarizing plate 18b and optical compensation film 32b are attached, is tightly held by frame members 30d, 30e. Emitting side polarizing plate 18b is connected to upper and lower holders 28a, 28b, with a gap between emitting side polarizing plate 18b and color combining prism 14.

Figure 10C:
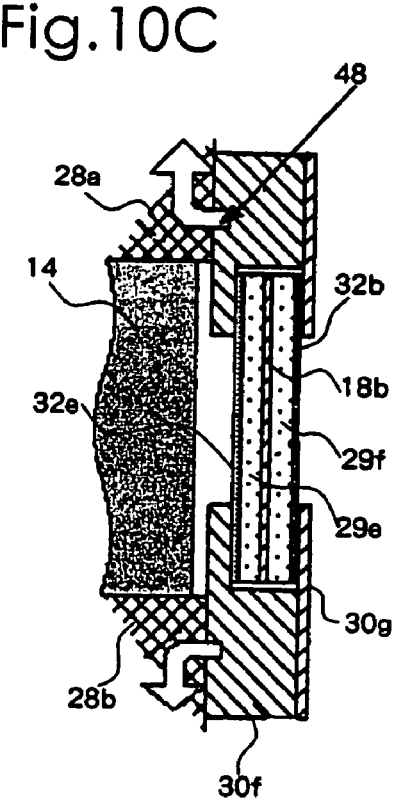

Alternatively, emitting side polarizing plate 18b may be sandwiched between two translucent plates 29e, 29f, in order to promote heat diffusion from both surfaces, i.e., from the incident side surface and from the emitting side surface, as shown in FIG. 10C. Translucent plates 29e, 29f, on which emitting side polarizing plate 18b and optical compensation films 32b, 32e are stacked, are tightly held by two frame members 30f, 30g having a high thermal conductivity. Emitting side polarizing plate 18b is connected to upper and lower holders 28a, 28b with a gap between emitting side polarizing plate 18b and color combining prism 14.

Such a mechanism for cooling emitting side polarizing plates has the following advantages. (1) A compact heat receiving structure can be achieved because only emitting side polarizing plates are cooled by the liquid cooling module. (2) The reduction in size and noise of the radiator is facilitated due to the reduction in cooling load. (3) The liquid cooling module can be mounted with minimum interference with the above mentioned air cooling module. (4) A high cooling efficiency for the emitting side polarizing plates can be achieved, because the heat in the emitting side polarizing plates is diffused from the incident surface and from the emitting surface thereof, and is absorbed by the upper and lower holders. Further, a uniform temperature distribution can be achieved in the emitting side polarizing plates. These characteristics contribute to a longer life time of the emitting side polarizing plates and improvement in the quality of images.

Next, detailed explanations are given about the mechanism for cooling liquid crystal units according to the second embodiment of the present invention with reference to the drawings. There is room for improvement in the first embodiment, in which a pair of jackets 35a, 35b are arranged on upper and lower holders 28a, 28b, in that (1) a multi-jacket configuration leads to an expensive liquid cooling module, (2) the system thermal resistance is increased due to a larger pressure loss in the circulation path of the coolant that arises from the multi-jacket configuration, (3) the height of space necessary for mounting a liquid crystal unit increases by the height that corresponds to the thickness of the jacket, (4) productivity is worsened due to complicated assembling work, (5) the number of tubes is increased, which leads to a longer total length of resin tubes, and thereby to the increase in the amount of volatilized coolant (and the capacity of the reservoir tank), and to the increase in the number of potential leak locations. Further, either of upper or lower holders 28, which are connected to jackets 35, is usually provided with through hole 31a for UV irradiation at the central portion of the holder in order to attach holders 28 to color combining prism 14. However, through hole 31a restricts the design of the flow passage in the jacket, and reduces the area that is in contact with the jacket, resulting in a lower capacity to receive heat.

Figure 12:
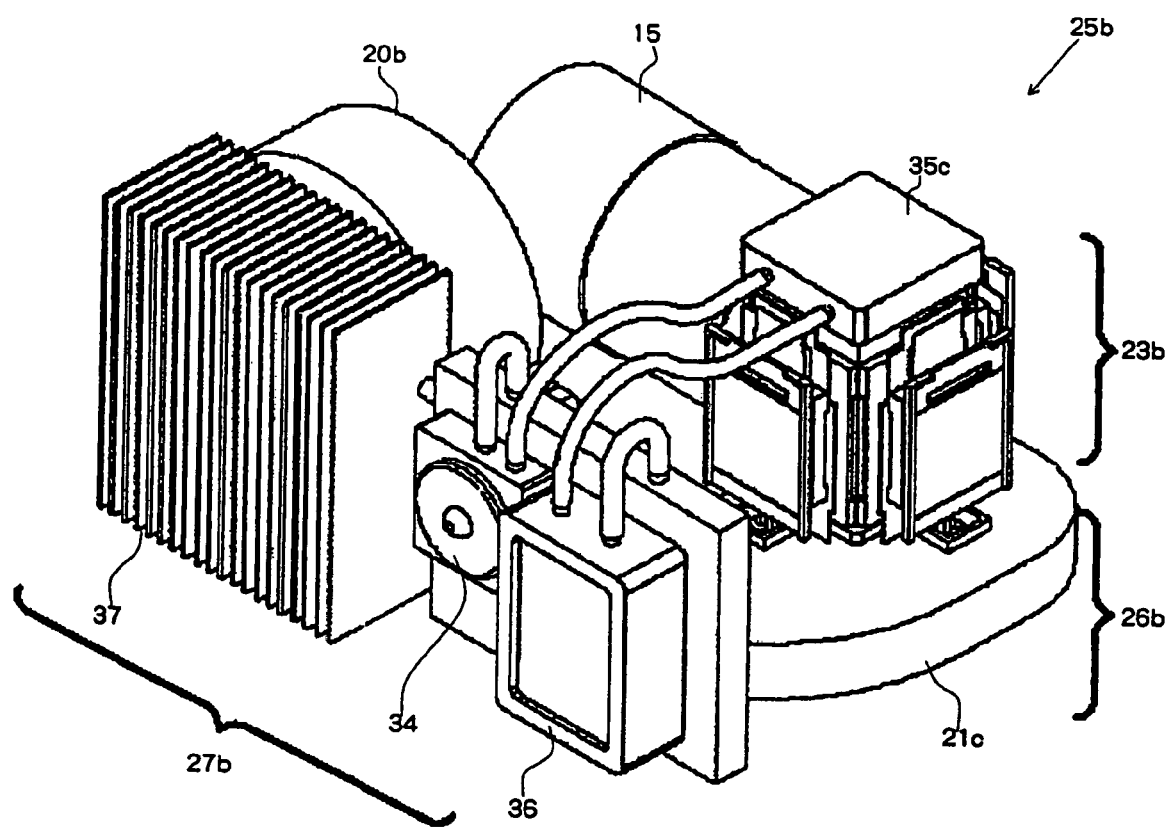
FIG. 12 is a perspective view of a mechanism for cooling liquid crystal units according to a second embodiment of the present invention.
Figure 13:
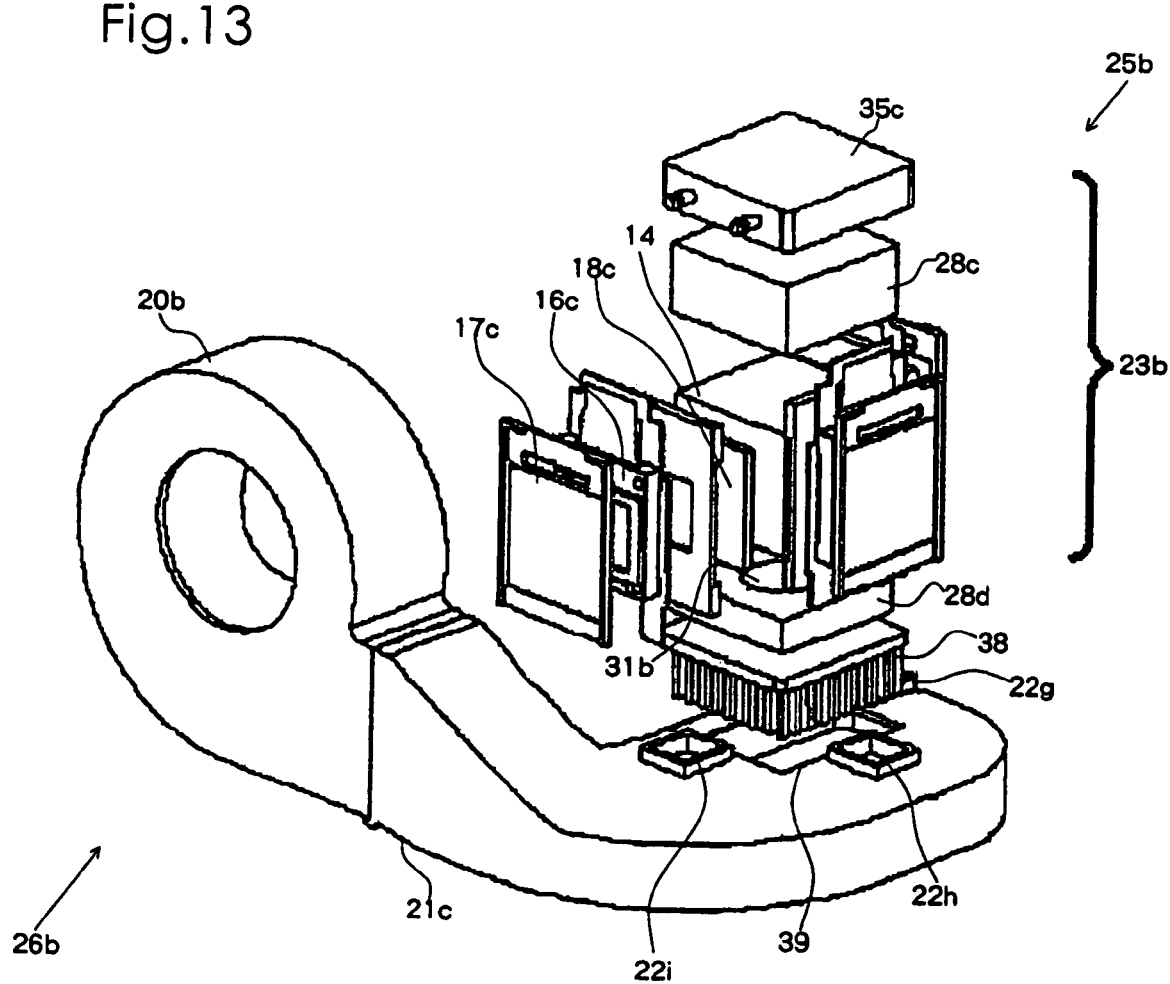
FIG. 13 is an exploded view of a mechanism for cooling liquid crystal units according to the second embodiment of the present invention.

The mechanism for cooling liquid crystal units according to the second embodiment can overcome these potential disadvantages in the first embodiment. Referring to FIGS. 12 and 13, mechanism for cooling liquid crystal units 25b is provided with liquid crystal unit assembly 23b, air cooling module 26b, and liquid cooling module 27b which functions as a heat exchanger.

Liquid crystal unit assembly 23b is similar to that of the first embodiment. Holder 28d, which is arranged under color combining prism 14, is provided with above-mentioned through hole 31b for UV irradiation.

Liquid cooling module 27b has a single-jacket configuration in which one jacket is omitted from liquid cooling module 27a of the first embodiment.

Figure 14:
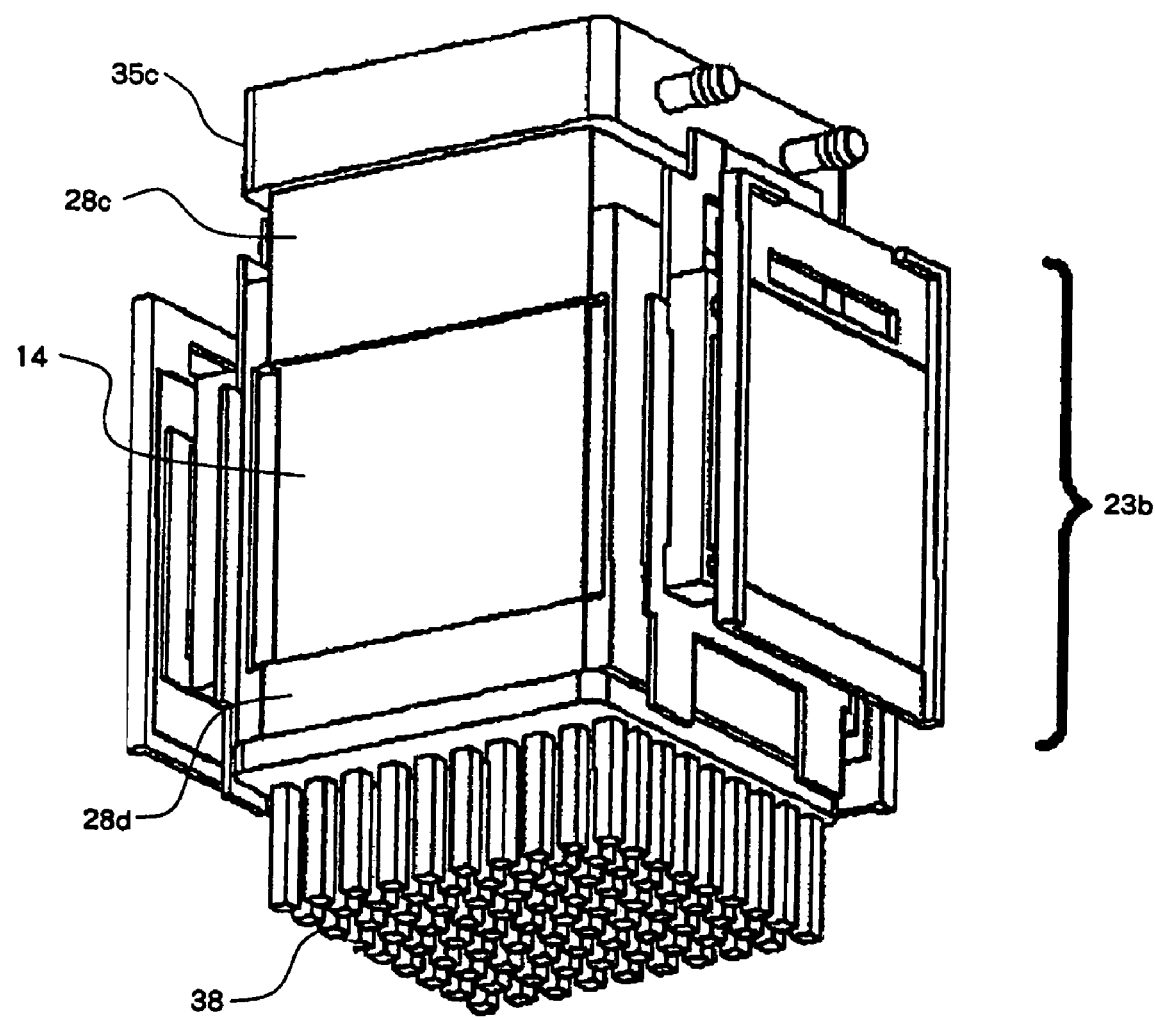
FIG. 14 is a perspective view of a liquid crystal unit assembly according to the second embodiment of the present invention.

Jacket 35c is connected with upper holder 28c via the surface that is opposite to the surface to which color combining prism 14 is attached. Lower holder 28d, which is provided with through hole 31b for UV irradiation, is connected with heat sink 38 of a pin fin type. As shown in FIG. 14, heat radiating fins of heat sink 38 extend toward the inside of duct 21c, as will be described later.

Figure 15:
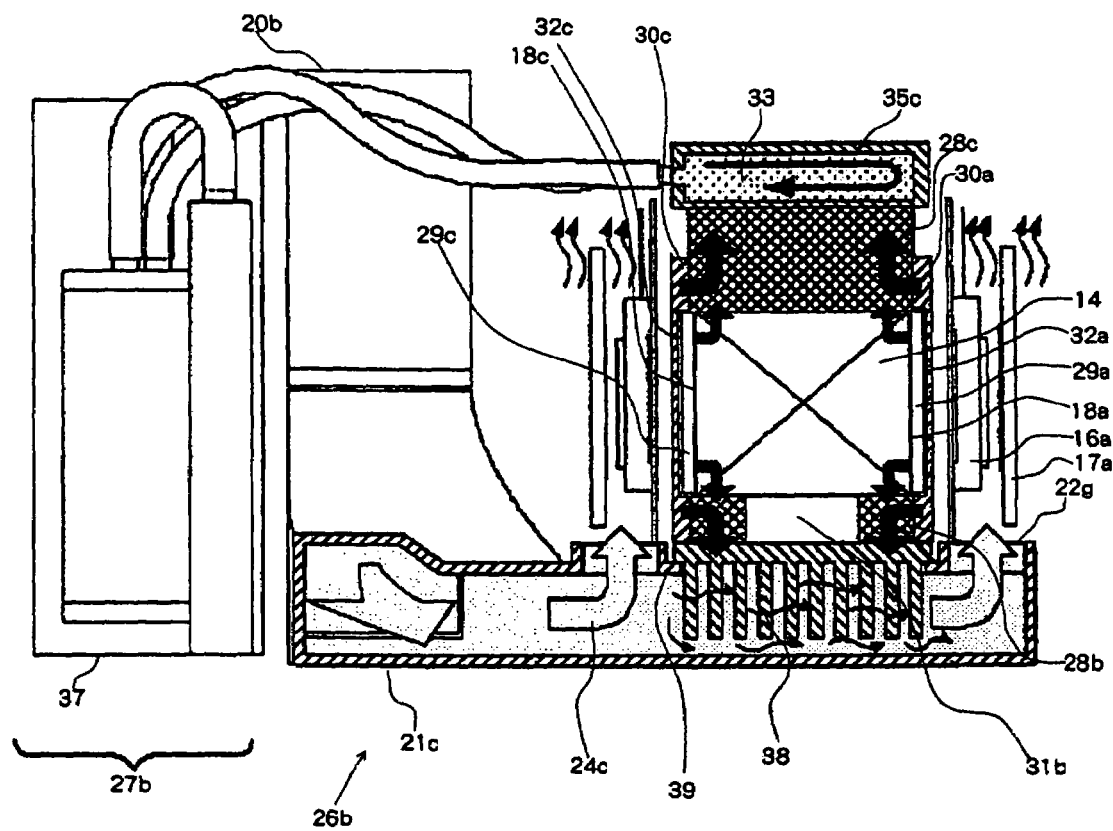
FIG. 15 is a sectional view showing the operation of the mechanism for cooling liquid crystal units according to the second embodiment of the present invention.

Air cooling module 26b, which consists of cooling fan 20b and duct 21c, is arranged under liquid crystal unit assembly 23b, similarly to the first embodiment. Recess 39 is formed in duct 21c at a location where the heat sink is mounted. Heat sink 38 that is connected to lower holder 28d is fitted into duct 21c when it is mounted. The heat in heat sink 38 is removed within duct 21c by cooling air 24c that is used to cool the incident side polarizing plates and the liquid crystal panels, as shown in FIG. 15.

Next, operation of mechanism for cooling liquid crystal units 25b according to the second embodiment is explained with reference to FIG. 15. The configuration for holding emitting side polarizing plates 18a, 18b, 18c is similar to that of the first embodiment. The heat that is generated in emitting side polarizing plates 18a, 18b, 18c through heat absorption is diffused from the transparent surfaces thereof via translucent plates 29a, 29b, 29c and color combining prism 14. The heat is transmitted to upper and lower holders 28c, 28d via color combining prism 14 and frame members 30a, 30b, 30c, as indicated by the black arrows.

The heat that is transmitted to upper holder 28c, similarly to the first embodiment, is conveyed to jacket 35c of liquid cooling module 27b, which is connected to holder 28c via the surface that is opposite to the surface to which color combining prism 14 is attached. The heat is transported to radiator 37 through the circulation of the coolant, and is radiated to the surrounding air.

The heat that is transmitted to lower holder 28d is transmitted to heat sink 38, which is connected to holder 28d via the surface that is opposite to the surface to which color combining prism 14 is attached. The heat is transmitted to cooling air 24c within duct 21c via the fins, and is removed through forced air cooling. Heat sink 38 may have plate fins or pin fins or any other configurations that suit the characteristic of the air flow in the duct.

Lower holder 28d and heat sink 38, which are separate elements, may be integrated for simplification. In this configuration, an opening has to be formed in the fin portion in accordance with through hole 31b for UV irradiation, although the capacity for radiating heat may be degraded.

Incident side polarizing plates 17a, 17b, 17c and liquid crystal panels 16a, 16b, 16c, similarly to the first embodiment, are cooled through forced air cooling by the air flow in duct 21c of air cooling module 26c that is generated by the fan.

Cooling air 24c that flows toward incident side polarizing plates 17 and liquid crystal panels 16 suffers an increase in temperature because of the heat that cooling air 24c receives from heat sink 38 in the duct. However, the increase in temperature is limited, because (1) the heat that the heat sink receives is generated only in emitting side polarizing plates 18, and more specifically, only in lower holder 28d which transmits approximately half the total amount of the heat; (2) the temperature rise in the base portion of heat sink 38 is limited due to the heat diffusion to the elements having a high thermal conductivity, such as translucent plates 29, color combining prism 14, frame members 30, and holders 28. Accordingly, the increase in temperature inside the duct, which is caused by heat radiation through the fins, is suppressed, and influence on the performance for cooling incident side polarizing plates 17 and liquid crystal panels 16 is negligible.

In addition to the advantages of the first embodiment, liquid crystal unit cooling mechanism 25b according to the second embodiment has the advantage that it has a reduced number of jackets and a simplified structure. Accordingly, (1) cost can be reduced; (2) mountability is improved since the jacket is arranged only on the side of the upper holder; (3) the system thermal resistance design of the liquid cooling module can be facilitated due to the short circulation length and reduced flow resistance; (4) reduction in size and noise of the radiator can be achieved because the cooling load of the liquid cooling module is reduced by approximately one half; (5) the amount of coolant that will be volatilized from resin tubes is suppressed and the reservoir tank can be reduced in size because of the simplified piping arrangement; (6) reliability of the apparatus is improved because of the simplified piping arrangement; (7) the height of the apparatus can be reduced because the heat sink, which corresponds to the jacket that is connected with the lower holder, is substantially accommodated inside the duct.

Figure 16A:
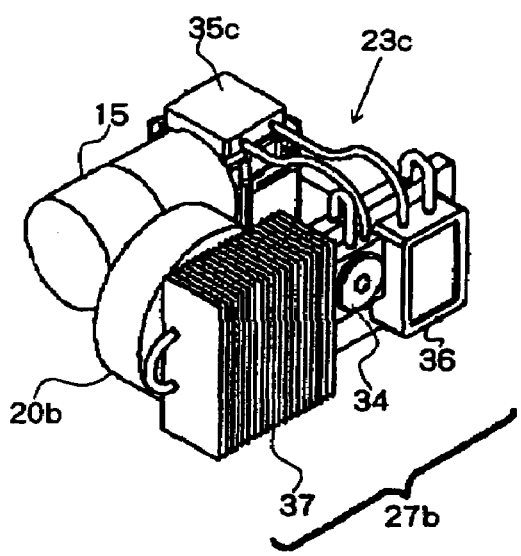
Figure 16B:
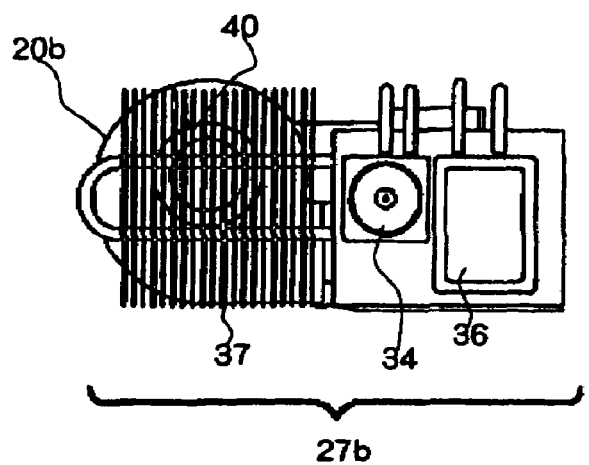
Figure 16C:
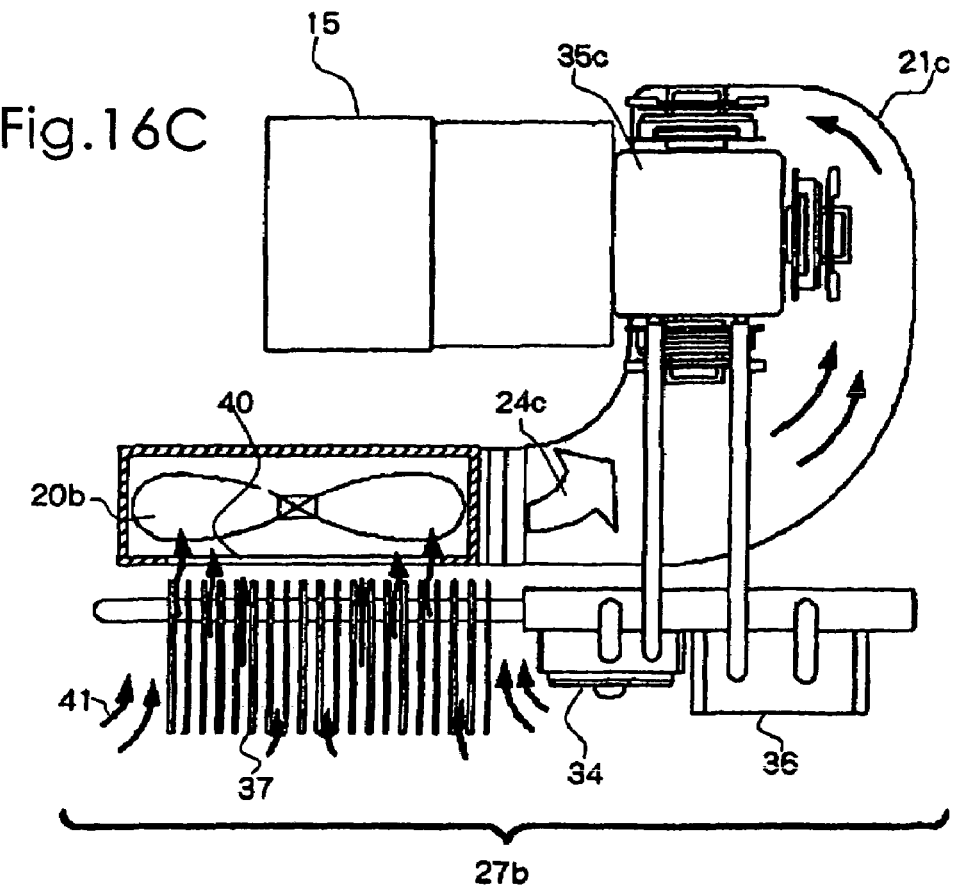

Next, detailed explanations are given about the mechanism for cooling liquid crystal units according to the third embodiment of the present invention with reference to FIG. 16. The third embodiment may be combined with the first embodiment or the second embodiment. In the following description, the third embodiment is combined with the second embodiment.

In the second embodiment, the combination of air cooling module 26b (see, FIGS. 12 and 13), which performs forced air cooling for incident side polarizing plates 17 and liquid crystal panels 16, and the heat exchanger (liquid cooling module 27b), which cools emitting side polarizing plates 18 through heat transfer, are used. In the third embodiment, radiator 37, which functions as a heat exchanger, is arranged in the vicinity of intake 40 for air cooling fan 20b in air cooling module 26b. Air 41, which is drawn into intake 40 that is connected with cooling fan 20b, is used for radiator 37 in order to promote heat radiation through forced convection heat transfer.

Radiator 37 is provided with stacked plates in order to reduce intake resistance for air cooling fan 20b. However, any type of radiators may be used which does not affect the intake of the fan and which has sufficient efficiency for heat radiation.

In the third embodiment, since heat is radiated from radiator 37 that is arranged near intake 40 for cooling fan 20b, which performs forced air cooling for incident side polarizing plates 17 and liquid crystal panels 16, the temperature of the air (cooling air 24c) rises. However, in the liquid cooling module (heat generation 30 W, system thermal resistance 0.5° C./V) that is described in the first and second embodiments, the coolant temperature at the heat radiating portion (radiator 37) is lower than the coolant temperature at the heat receiving portion (jacket 35c) by about 10 degrees, though it is dependent on the amount of heat and the system thermal resistance design. Also, the surface temperature of the radiator is lower than the coolant temperature at the heat receiving portion (jacket 35c) by about 5 degrees. Therefore, the temperature rise of intake air for cooling fan 20b that is caused by heat radiation of radiator 37 is not so significant. Further, since cooling fan 20b simultaneously takes air, which is not affected by heat radiation, from around radiator 37 due to the low directivity of the air flow near the intake, the increase in intake air temperature is further suppressed. Accordingly, the influence on forced air cooling for incident side polarizing plates 18 and liquid crystal panels 16 is almost negligible.

In such an arrangement of the radiator for the heat exchanger according to the third embodiment, a fan is not required for heat radiation from the radiator, leading to a reduction in the cost of the overall cooling system and in noise. In addition, the size of the apparatus can be also reduced due to the reduction in the space necessary for mounting of the apparatus.

In the first, second, and third embodiments, a liquid cooling module is used as a heat exchanger. However, it is obvious that the same effect can be obtained by other types of heat exchangers, such as a heat pipe or a vapor chamber.

Finally, differences between the method for cooling liquid crystal units of prior arts, which are explained with reference to FIGS. 3 to 6, and the method according to the present invention are explained.

Figure 3:
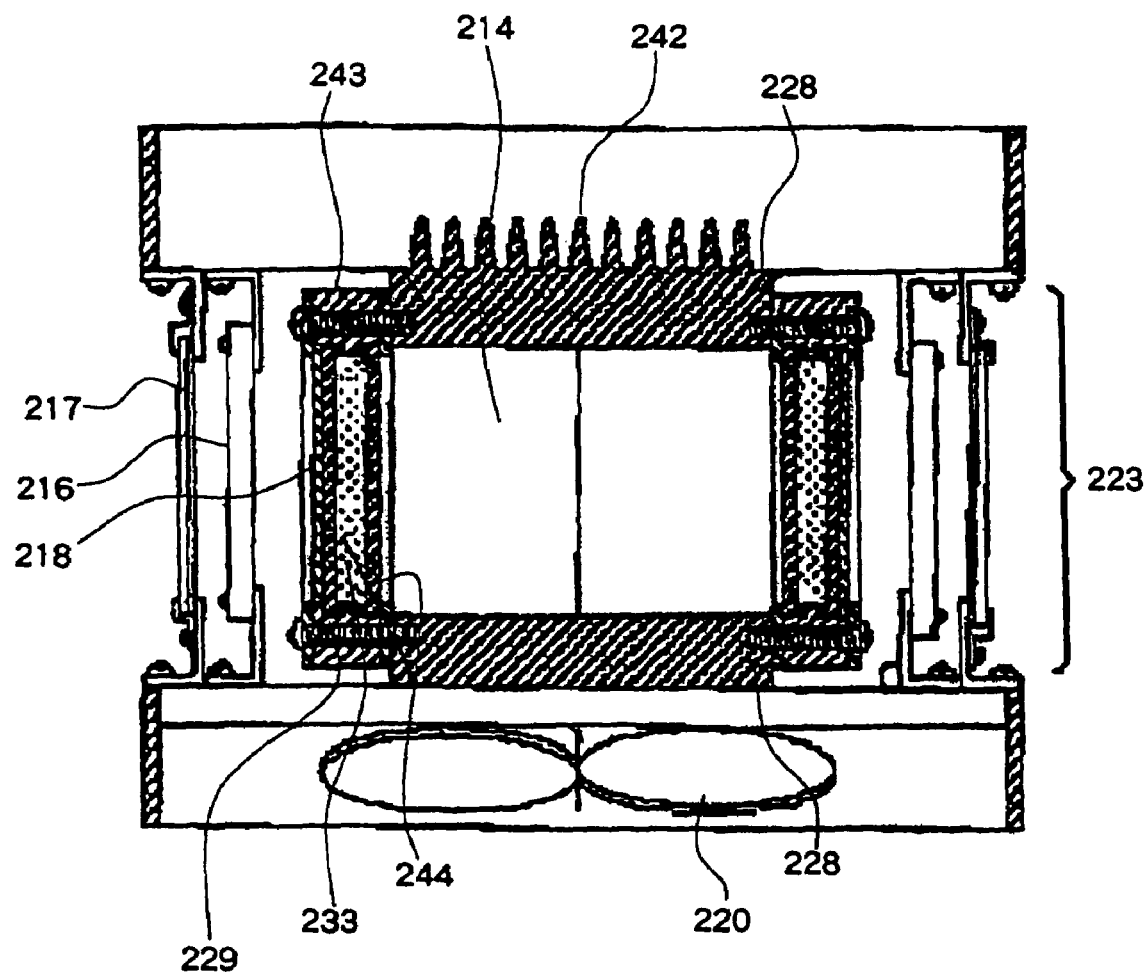
FIG. 3 is a schematic sectional view of a mechanism for cooling liquid crystal units according to prior art.
Figure 4:
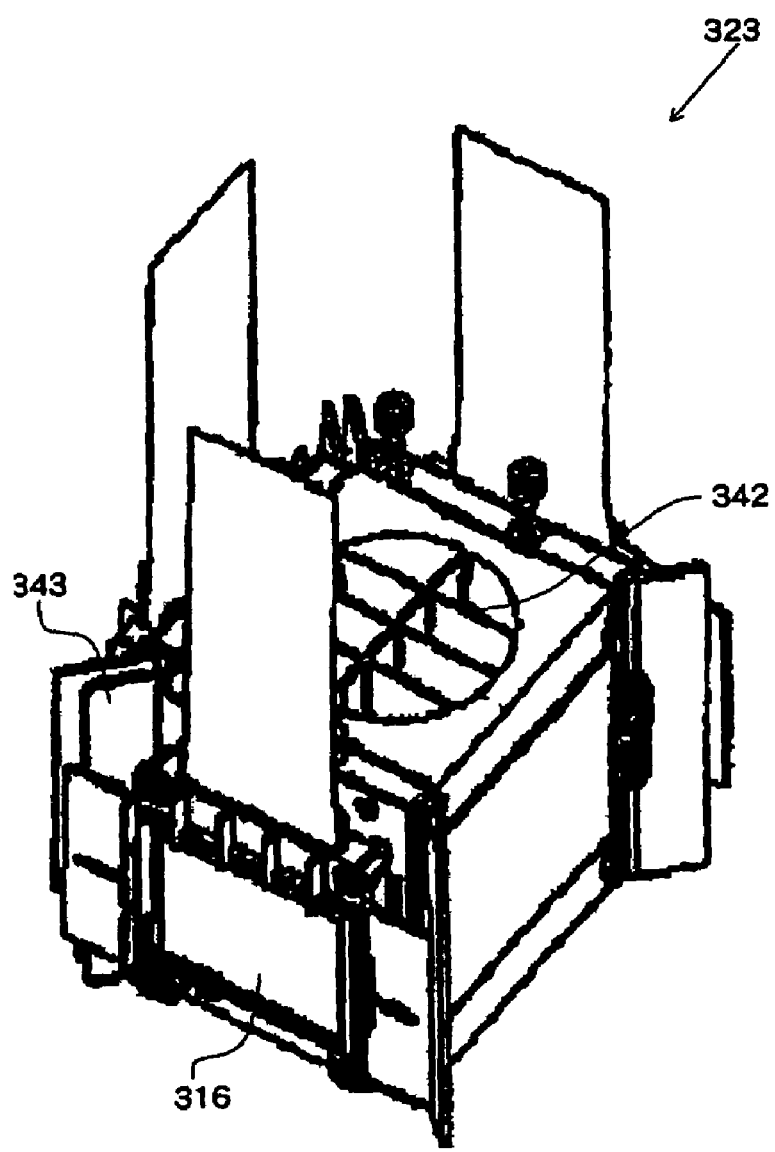
FIGS. 4 to 6 are schematic perspective views of mechanisms for cooling liquid crystal units according to prior art.

The first embodiment of the present invention is similar to the prior arts shown in FIGS. 3 and 4 in that heat that is generated in emitting side polarizing plates 18 is transmitted to holders 28 for color combining prism 14 in order to cool emitting side polarizing plates 18. The first embodiment is different from the prior arts in that heat diffusion is promoted by translucent plates 29 and color combining prism 14, not by liquid coolant, and in that the heat is transported through solid heat transmission.

The prior arts, in which heat is diffused and radiated by liquid coolant 233 which is filled between and which is in contact with emitting side polarizing plates 218 and liquid crystal panels 316, have the above-described drawbacks. However, the drawbacks can be overcome by the present invention in which heat is transmitted to the heat exchanger by promoting heat diffusion through solid heat transmission. Further, since the color combining prism is used for solid heat transmission, the assembly is simplified. Therefore, it is also possible to improve thermal conductivity by increasing the flow rate by enlarging the space (gap) for cooling air between the incident side polarizing plates and the surfaces of the liquid crystal panels which are to be cooled.

The heat radiating structure for emitting side polarizing plates is different in that the heat exchangers are connected to the upper and lower holders for the color combining prism, and in that heat is radiated by the radiator that is remote from the heat source. According to the present embodiments, more effective cooling can be performed in this way.

In the prior arts shown in FIGS. 3, 4, upper holder 228 for color combining prism 214 is provided with heat radiating fins 242 in order to enhance heat radiating efficiency. On the other hand, according to the second embodiment, air cooling fins (heat sink) are attached to the lower holder. Further, since the fin portion is engaged in the duct of the air cooling module, which co-operates with the liquid cooling module, sufficient heat radiation by the fins can be obtained due to the sufficient level of forced convection heat transfer. The present invention is also different from the prior arts shown in FIGS. 3, 4 in these respects.

Additionally, in the first and second embodiments, the air cooling module, which co-operates with the liquid cooling module, is configured such that cooling air is concentrated on the incident side polarizing plates and the liquid crystal panels. Thus, the present invention is different from the prior arts in that the cooling margin can be easily ensured.

In the second embodiment of the present invention, the mechanism for cooling liquid crystal units is different from that of the prior art shown in FIG. 5 in the following respects. Specifically, in the second embodiment, a heat sink is attached to the lower holder for the color combining prism in order to dissipate heat that is transmitted from the emitting side polarizing plates through solid heat transmission. Further, fins to dissipate the heat extend into the duct, i.e., in the direction opposite to the prior art, and allow the dissipation of the heat in the heat sink within a duct. In this way, the heat sink according to the second embodiment is different, both in structure and in operation, from the heat sink of the prior art shown in FIG. 5, in which heat in the air that circulates in the duct is dissipated to the outside.

Figure 5:
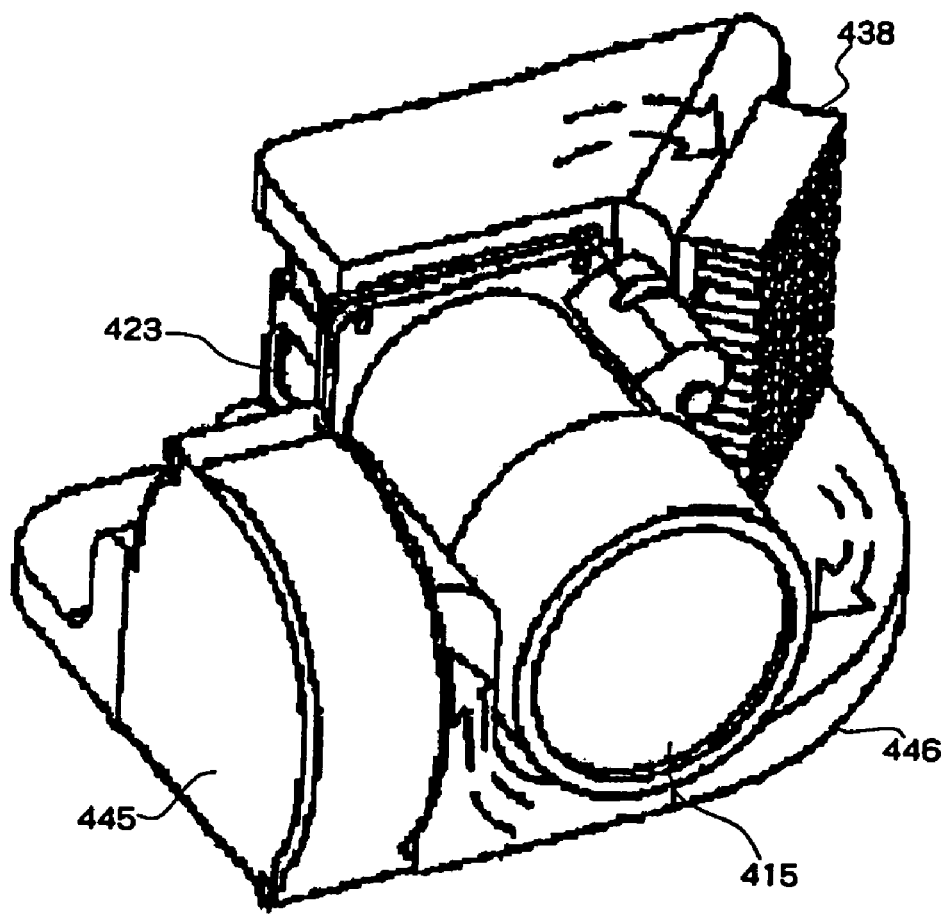
Figure 6:
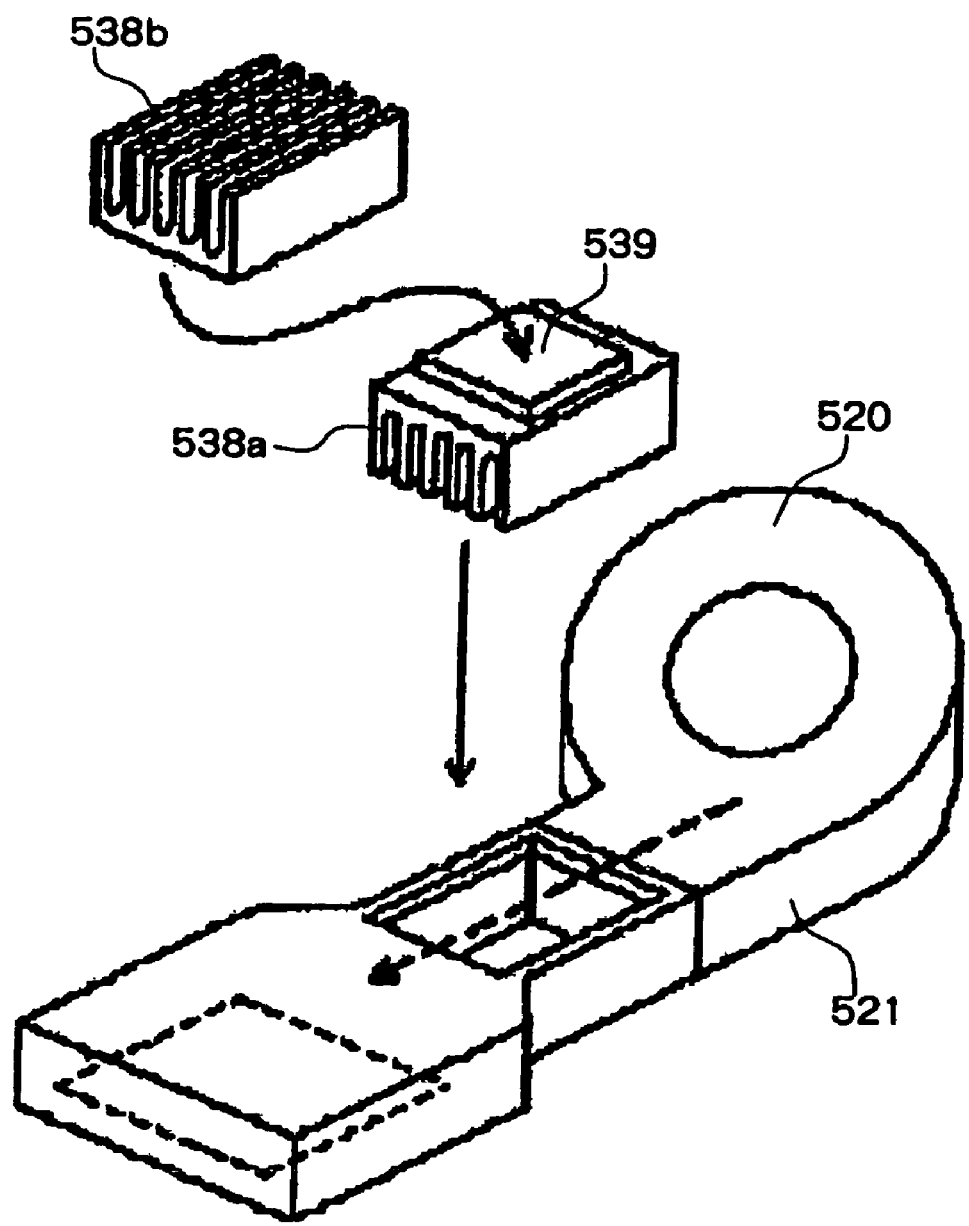

The heat sink shown in FIG. 6, similar to the prior art shown in FIG. 5, is different from the heat sink of the lower holder according to the second embodiment, in the manner in which it is attached, it operates, and the effect that it produces. Specifically, in this prior art, the cooling mechanism (heat sink 538 and Peltier element 539) is arranged in duct 521 that supplies cooling air to liquid crystal panels, in order to cool the air in the duct. The second embodiment is different from the prior art in that the heat absorbing structure for the emitting side polarizing plate (frame members, holders 28, and heat sink 38) is arranged in order to radiate the heat to the cooling air in the duct, and in that heat radiating fins are arranged just below the liquid crystal unit.

Although a certain preferred embodiments of the present invention have been shown and described in detail, it should be understood that various changes and modifications may be made without departing from the spirit or scope of the appended claims.

What is claimed is:

1. A projection display apparatus comprising:
    a liquid crystal unit assembly which includes a liquid crystal panel, an incident side polarizing plate and an emitting side polarizing plate which are arranged on an incident side and on an emitting side of said liquid crystal panel, respectively, and a color combining prism;
    a fan;
    a duct which is connected to said fan and which is provided with an opening for supplying cooling air, wherein said opening is arranged near said liquid crystal panel and said incident side polarizing plate;
    a holder for holding said emitting side polarizing plate and said color combining prism; and
    a heat exchanger which is connected to said holder, wherein said heat exchanger uses liquid coolant.

2. The projection display apparatus according to claim 1, wherein said heat exchanger is connected to said holder via a surface of said holder, said surface being opposite to a surface to which said color combining prism is attached.

3. The projection display apparatus according to claim 2, further comprising:
    another holder for holding said color combining prism via a surface of said color combining prism, said surface of the color combining prism being opposite to a surface to which said holder is attached; and
    another heat exchanger, wherein said another heat exchanger is connected to said another holder via a surface of said another holder, said surface of the another holder being opposite a surface to which said color combining prism is attached.

4. The projection display apparatus according to claim 3, wherein each of said heat exchanger and said another heat exchanger is provided with a passage for said liquid coolant, said passage being arranged inside said heat exchanger and said another heat exchanger, and
    wherein said projection display apparatus further comprises:
        a pump for circulating said liquid coolant; and
        a radiator for cooling said liquid coolant.

5. The projection display apparatus according to claim 4, wherein said radiator is arranged near an air intake of said fan.

6. The projection display apparatus according to claim 3, wherein said another heat exchanger includes a fin that is connected to said another holder, said fin being inserted into said duct, and
    wherein said heat exchanger is provided with a passage for said liquid coolant said passage being arranged inside said heat exchanger, and
    wherein said projection display apparatus further comprises:
        a pump for circulating said liquid coolant; and
        a radiator for cooling said liquid coolant.

7. The projection display apparatus according to claim 3, wherein said another heat exchanger comprises a fin that is connected to said another holder.

8. The projection display apparatus according to claim 1, wherein said emitting side polarizing plate is sandwiched between a translucent plate and said color combining prism, and
    wherein said emitting side polarizing plate is connected to said holder by a frame member.

9. The projection display apparatus according to claim 1, wherein said color combining prism has a higher thermal conductivity than said emitting side polarizing plate.

10. The projection display apparatus according to claim 1, wherein the emitting side polarizing plate is not cooled by the cooling air.

11. The projection display apparatus according to claim 1, wherein the emitting side polarizing plate is cooled by exchanging part of heat in said emitting side polarizing plate with said liquid coolant rather than the cooling air.

12. The projection display apparatus according to claim 1, wherein heat is removed from the emitting side polarizing plate by a different mechanism than a mechanism that removes heat from the incident side polarization plate.

13. The projection display apparatus according to claim 1, wherein said projection display apparatus further comprises another holder which is connected with a pin fin type heat sink that is installed inside said duct.

14. A method for cooling a liquid crystal unit which includes a liquid crystal panel, an incident side polarizing plate and an emitting side polarizing plate which are arranged on an incident side and on an emitting side of said liquid crystal panel, respectively, said method comprising:
    a first cooling of said incident side polarizing plate and said liquid crystal panel through heat exchange with cooling air; and
    a second cooling of said emitting side polarizing plate by exchanging part of heat in said emitting side polarizing plate with liquid coolant.

15. The method according to claim 14, wherein said second cooling comprises:
    transmitting heat in said emitting side polarizing plate to said liquid coolant via two sides of said emitting side polarizing plate, said two sides being opposite to each other; and
    radiating the heat using a radiator, the heat being transmitted by said liquid coolant.

16. The method according to claim 14, wherein said second cooling comprises:

transmitting part of heat in said emitting side polarizing plate to a fin that is inserted into a duct, via a first side of said emitting side polarizing plate;

transmitting the heat to the cooling air in said duct, the heat being transmitted to said fin;

conveying the cooling air using a fan, wherein the heat is transmitted to the cooling air;

transmitting part of the heat in said emitting side polarizing plate to the liquid coolant, via a second side that is opposite to said first side of said emitting side polarizing plate; and radiating the heat using a radiator, the heat being transmitted by said liquid coolant.

17. The method according to claim 16, wherein said radiating the heat includes drawing the cooling air from an air intake of said fan through said radiator.

18. The method according to claim 14, wherein heat is removed from the emitting side polarizing plate by a different mechanism than a mechanism that removes heat from the incident side polarization plate.

19. The method according to claim 14, wherein the emitting side polarizing plate is not cooled by the cooling air.

20. A projection display apparatus comprising:

a liquid crystal unit assembly which includes a liquid crystal panel, an incident side polarizing plate, and an emitting side polarizing plate;

a fan;

a duct which is connected to said fan and which is provided with an opening for supplying cooling air, wherein said opening is arranged near said liquid crystal panel and said incident side polarizing plate rather than said emitting side polarizing plate;

a holder for holding said emitting side polarizing plate and a color combining prism;

a heat exchanger which is connected to said holder, wherein said heat exchanger uses liquid coolant; and another holder which is connected with a pin fin type heat sink installed inside said duct.

* * * * *